US006921983B2

(12) United States Patent
Diamontopoulos

(10) Patent No.: US 6,921,983 B2
(45) Date of Patent: Jul. 26, 2005

(54) ELECTRIC GENERATION DEVICE

(76) Inventor: Aaron Jay Diamontopoulos, 6990 Sandcastle Dr., Carlsbad, CA (US) 92009

( * ) Notice: Subject to any disclaimer, the term of this patent is extended or adjusted under 35 U.S.C. 154(b) by 0 days.

(21) Appl. No.: 10/681,012

(22) Filed: Oct. 7, 2003

(65) Prior Publication Data

US 2005/0073151 A1 Apr. 7, 2005

(51) Int. Cl.[7] .............................................. H02P 9/14
(52) U.S. Cl. ............................ 290/1 R; 322/3; 310/23; 310/30
(58) Field of Search ........................... 290/1 R; 322/3; 310/23, 30

(56) References Cited

U.S. PATENT DOCUMENTS

| | | |
|---|---|---|
| 1,082,746 A | 12/1913 | Hemmenway |
| 3,546,473 A | 12/1970 | Rich |
| 3,696,251 A | 10/1972 | Last |
| 4,110,630 A | 8/1978 | Hendel |
| 4,191,893 A | 3/1980 | Grana |
| 4,260,901 A | 4/1981 | Woodbridge |
| 4,423,334 A | 12/1983 | Jacobi |
| 4,492,875 A | 1/1985 | Rowe |
| 5,136,173 A | 8/1992 | Rynne |
| 5,696,413 A | 12/1997 | Woodbridge |
| 6,220,719 B1 * | 4/2001 | Vetorino et al. ............ 362/192 |
| 6,515,375 B1 | 2/2003 | Beal |
| 6,768,230 B2 * | 7/2004 | Cheung et al. ............... 310/30 |
| 6,798,090 B2 * | 9/2004 | Cheung et al. ............... 310/17 |

* cited by examiner

Primary Examiner—Darren Schuberg
Assistant Examiner—Iraj A. Mohandesi
(74) Attorney, Agent, or Firm—Gordon & Rees LLP; Hani Z. Sayed

(57) ABSTRACT

A electric generation device and a method for using the same is provided. The electric generation device has a unique configuration that allows the device to generate electrical energy from the natural turbulence of a free body of water. The electric generation device uses a free flowing magnet and wire coils that capture electrons as the magnet is moved and transmit the electrons from the electric generation device to a diode bridge. The diode bridge transforms the flow of electrons to a constant polarity which allows for storage of a maximized amount of electrical power. The power may be converted to alternating current (AC) power and/or direct current (DC) power. The electric generation device may be combined with a plurality of the same to form a larger power generating grid.

20 Claims, 3 Drawing Sheets

ELECTRIC GENERATION DEVICE

FIELD OF THE INVENTION

This invention relates to the field of electric generation. More specifically, this invention relates to a device that uses the natural motion of water to produce and generate electrical current. Further, this invention relates to a device that allows for generation and collection of electrical current with minimal effort and energy.

BACKGROUND OF THE INVENTION

Electrical power is one of the most important components of our everyday lives. We use electrical energy to almost everything, from electronics, to water heaters, to light bulbs and even cars. However, generating the electrical power that we need has not always been an easy process. Most of our electrical power is generated by burning coal and/or from hydroelectric generation. Burning coal can be expensive and may have adverse effects on the environment, wherein the environmental effects of hydro-electric generation are not as extreme, but may still disrupt a very fragile eco-system.

Hydro-electricity generators change the energy of moving water into electrical energy. The generators may produce electrical current by using a continuous flow of water to turn a water turbine that is connected to an electricity generator and/or alternator. Water flows from a dam or reservoir to the turbine through a huge pipe called a penstock. The water passes through a spiral-shaped pipe making it spin. The spinning water makes the turbine turn. In order to maintain consistency, the speed of the turbine should remain constant so that the amount of electrical energy being produced remains the same at all times. Any fluctuation in the amount of electrical energy being produced could cause instability and breakdown of the generators and/or circuits and capacitors used to contain and store the electrical energy produced. The amount of electricity that may be produced from hydro-electric generation may depend on the rate on which the water flows and the difference in height between the water in the top of the dam or reservoir and the water in the lower part for the reservoir below the turbine.

The first hydro-electric generation process began in 1882 and one of the largest electrical plants is located in Niagra Falls, USA. As the need for electricity increased, it became necessary to build more and more dams and/or reservoirs to produce hydro-electricity.

However, as more and more hydro-electric stations go up, so do the number of dams and reservoirs necessary to facilitate the hydro-electric generation process. The increased number of dams and reservoirs have an adverse affect on the environment around them, by swamping lush growing land, and disrupting the natural flow of water. Moreover, the institution of dams and reservoirs disrupts the natural ecosystem of an area by creating and/or destroying natural ecosystems.

Therefore, what is needed is a electrical generation device that produces sufficient hydro-electric power without disrupting the natural ecosystem and without creating and maintaining a dam, generator/alternators and the like. Further, a hydro-electric generation device is need that may provide electric energy with minimal effort and minimal disruption to the surrounding environment.

SUMMARY OF THE INVENTION

The present invention provides a device to develop electric energy by using the natural turbulence of water. More specifically, the present invention provides an electric generation device that uses the ocean's turbulence as force to generate electrical energy that may be collected and/or stored by the device and consequently removed and used as a source of energy. The present invention also provides a electric generation device that uses the natural turbulence of water without any additional driving mechanism.

To this end, in an embodiment of the present invention, an electric generation device is provided. The electric generation device has a body having a top side and a bottom side. The body is generally cylindrical in shape and has an opening thereon. The device also has a magnet contained within the body of the device wherein the magnet is placed in the opening of the body. A plurality of wire core is enclosed within the body of the electric generation device to collect electron flow. The electric generation device also has a diode bridge connected to the wire coil wherein the wire coil leads to the diode bridge.

In an embodiment, the electric generation device has an opening contained between the top side and the bottom side of the body.

In an embodiment, the electric generation device has a plurality of diode bridges that may be attached to each other to transport electric power.

In an embodiment, the electric generation device has a diode bridges that transforms the flow of energy to a constant polarity for facilitation of storage of electrical power.

In an embodiment, the electric generation device has a spool flange wherein the wire coil is attached thereto.

In an embodiment, the electric generation device has a spool cover attached to the spool flange wherein the spool cover covers the spool flange to protect the wire core and the magnet from contaminants and destruction.

In an embodiment, the electric generation device may have a power converter to convert the electron flow to constant polarity wherein the power converter transports electron flow in direct current power or alternating current power.

In an embodiment, the electric generation device may have a diode bridge to convert the electron flow to * polarity wherein the diode bridge transports electron flow to a converter.

In an embodiment, the electric generation device has a plurality of devices attached together to form a power station.

In an embodiment, the electric generation device has a storage means for storing the power collected by the electric generation device.

In an embodiment of the present invention, a method for using a electric generation device is provided. The method includes the steps of: providing a body having an inside and an outside wherein said body is cylindrical in shape; providing a wire coil in association with the inside of the body; providing a magnet within the body of the device; enclosing the magnet within the electric generation device, wherein a space exists between the magnet and the wire coil in association with the inside of the body.

In an embodiment, the method comprises the step of providing a wire connected to a diode bridge wherein said diode bridge transforms the flow of electric current to a constant polarity.

In an embodiment, the method comprises the step of attaching a plurality of the devices together to create a network of electric generation devices.

In an embodiment, the method comprises the step of inserting the device into a free body of water.

In an embodiment, the method comprising the step of allowing the magnet to be moved in response to natural turbulence in the water.

In an embodiment, the method comprises the step of generating a flow of electrons that moves into the wire coil and wherein the wire coil conducts the flow of electrons to a subsequent electric generation device.

In an embodiment, the method comprises the step of generating a flow of electrons that moves into the wire coil and wherein the wire coil conducts the flow of electrons to a diode bridge.

In an embodiment, the method comprises the step of converting the electron flow into direct current power.

In an embodiment, the method comprises the step of converting the electron flow into alternating current power.

In an embodiment, the method comprises the step of providing a storage means for collecting and storing the generated electric power.

In an embodiment, the method comprises the step of providing a transportation means between the electric generation device and the storage means.

It is, therefore, an advantage of the present invention to provide a electric generation device and a method for using the same.

Another advantage of the present invention is to provide a electric generation device and a method for using the same wherein the device has a spool flange.

Still another advantage of the present invention is to provide a electric generation device and a method for using the same wherein the device has a spool core.

Yet another advantage of the present invention is to provide a electric generation device and a method for using the same wherein the device has a wire core.

Still another advantage of the present invention is to provide a electric generation device and a method for using the same wherein the device has wire coils.

Another advantage of the present invention is to provide a electric generation device and a method for using the same wherein the device may have a spool core cover attached to the flange.

Yet another advantage of the present invention is to provide a electric generation device and a method for using the same wherein the device may have a diode bridge to convert electron flow into constant polarity power.

Still another advantage of the present invention is to provide a electric generation device and a method for using the same wherein the device has a magnet contained inside the device.

An advantage of the present invention is to provide a electric generation device and a method for using the same wherein the device may be placed in any free body of water to collect electric current.

Yet another advantage of the present invention is to provide a electric generation device and a method for using the same wherein the device may be placed in the ocean to collect electric energy.

Another advantage of the present invention is to provide a electric generation device and a method for using the same wherein the device does not require any outside power supply to power the device.

Yet another advantage of the present invention is to provide a electric generation device and a method for using the same wherein the device may be connected to a plurality of other generation devices to create a power station.

Still another advantage of the present invention is to provide a electric generation device and a method for using the same wherein the device may have a diode bridge that transforms the flow of electrons into alternating current (AC) power.

Another advantage of the present invention is to provide a electric generation device and a method for using the same wherein the device may have a diode bridge that transforms the flow of electrons into direct current (DC) power.

Another advantage of the present invention is to provide a electric generation device and a method for using the same wherein the device may have a diode bridge that transforms the flow of electrons into alternating current (AC) power.

Still another advantage of the present invention is to provide a electric generation device and a method for using the same wherein the turbulence of the ocean is turned into electrical power.

Yet another advantage of the present invention is to provide a electric generation device and a method for using the same wherein the turbulence of the ocean causes the magnet to move within the device which generates a flow of electrons.

Another advantage of the present invention is to provide a electric generation device and a method for using the same wherein the device may generate power efficiently.

Yet another advantage of the present invention is to provide a electric generation device and a method for using the same wherein the device may generate power without the need for external forces applied to the device other than the natural turbulence of water.

Still another advantage of the present invention is to provide a electric generation device and a method for using the same wherein the device may maximize the power supplied regardless of the amount of water turbulence because the turbulence of even the smallest wave provides more power or strength than the device needs or weighs to move it enough to generate a current.

An advantage of the present invention is to provide a electric generation device and a method for using the same wherein the device may be created in a cost efficient manner.

Another advantage of the present invention is to provide a electric generation device and a method for using the same wherein the device may be shut off and or removed from the water with relative ease.

Yet another advantage of the present invention is to provide a electric generation device and a method for using the same wherein the device is portable and may be moved to different locations when needed.

Still another advantage of the present invention is to provide a electric generation device and a method for using the same wherein the device may have a storage means for storing the collected power.

Yet another advantage of the present invention is to provide a electric generation device and a method for using the same wherein the device may use a magnet, coil wire and natural turbulence of water to produce electric power.

An advantage of the present invention is to provide a electric generation device and a method for using the same wherein the device may use a coil wire to conduct the electrons from the magnet to the diode bridge.

Yet another advantage of the present invention is to provide a electric generation device and a method for using the same wherein the device may be any shape.

Still another advantage of the present invention is to provide a electric generation device and a method for using the same wherein the device may be cylindrical in shape.

Another advantage of the present invention is to provide a electric generation device and a method for using the same wherein the device may be compact as to not disrupt the natural flow of water.

These and other objects of the invention will become more clear when one reads the following specification, taken together with the drawings that are attached hereto. The scope of protection sought by the inventors may be gleaned from a fair reading of the Claims that conclude this specification.

Additional features and advantages of the present invention are described in, and will be apparent from, the detailed description of the presently preferred embodiments and from the drawings.

DESCRIPTION OF THE PREFERRED EMBODIMENT

Figure 1:
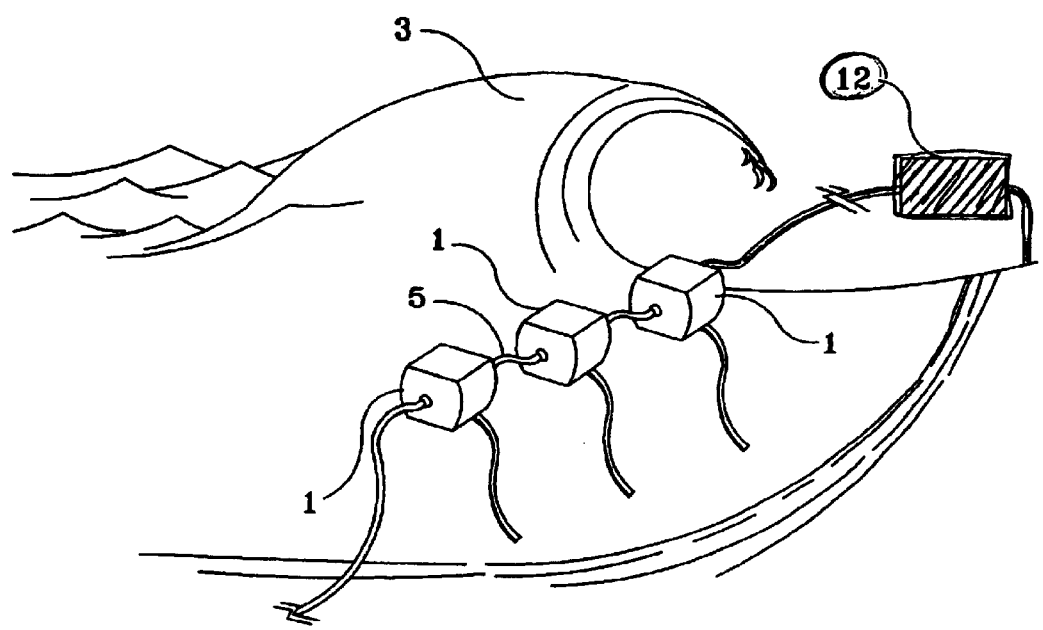
FIG. 1 is a perspective view of the electric generation device shown in a free body of water in an embodiment of the present invention.

Turning now to the drawings wherein elements are identified by numbers and like elements are identified by like numbers throughout the 5 figures, the invention is depicted in FIG. 1 that shows a electric generation device. As shown in FIG. 1, the electric generation device 1 is used in water 3. The water 3 is the driving force behind the generation of electrical current. As illustrated in FIG. 1, a plurality of electric generation devices 1 may be strung together in the water 3. The electric generation device 1 may be strung together using a feed wire 5. The feed wire 5 may exit the body of the device 1 and flow to another device 3 and continue to a plurality of electric generation devices.

Figure 2:
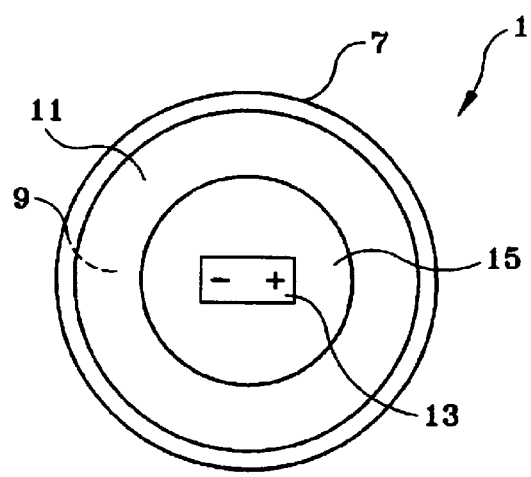
FIG. 2 is a cross sectional top view of the electric generation device in an embodiment of the present invention.

FIG. 2 illustrates a cross sectional top view of the electric generation device 1. The device has a body or spool flange 7 wherein the spool flange 7 may enclose and/or encompass a spool core 9. The spool core 9 may be contained within the spool flange 7 and may be protected from the elements by the spool flange 7. In a preferred embodiment, the spool flange 7 and/or body of the electric generation device 1 may be covered with a waterproof and dirt proof material (not shown) that may protect the device 1 from water, dirt and/or contamination from the water. A spool core cover 11 may be attached to the spool flange 7 which may further protect the core of the device 1 from dirt and/or contamination. The device may have a magnet 13 contained therein, wherein a space 15 may exist between the magnet 13 and the outer portion of the spool core 9. The space 15 between the spool core 9 allows the magnet 13 to be moved by the motive force of the water 3.

Figure 3:
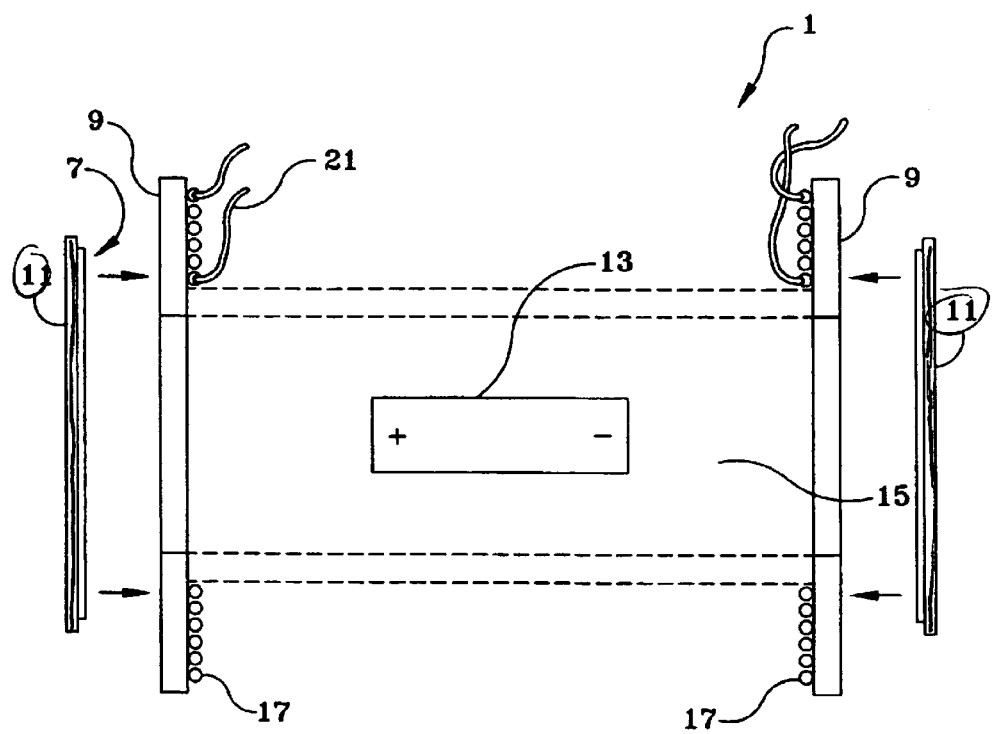
FIG. 3 is a side perspective view of the electric generation device in an embodiment of the present invention.

FIG. 3 further illustrates the inside of the electric generation device 1. As FIG. 3 illustrates, a spool flange 7 encloses the spool core 9. The spool core 9 may have a plurality of wire coil 17 attached thereto. The wire coil 17 is a distance away from the center of the device 1 and provides a space for the magnet 13. The magnet 13 may be contained within the spool core 9 and a distance away from the wire coil 17. The wire coil 17 is attached to the outside wall of the spool core 9 and encircles the space provided for the magnet 13. The magnet 13 may be contained within a space created by the outside wall of the spool core 9 wherein the distance between the outside edges of the spool core 9 is greater than the size of the magnet 13. Therefore, the magnet 13 may be freely movable between the outside edges of the spool core 9. For example, when ocean turbulence causes the device to move in water, the resulting movement of the magnet 13 in relation to the wire coil 17 may generate a flow electrons. The electrons may move through the wire coil 17 and flow out of the wire coil 17 through a lead wire 21. The lead wire 21 may facilitate the flow of electrons to another electric generation device as shown in FIG. 5, and/or may facilitate the flow of electrons to a diode bridge 23 as illustrated in FIG. 4.

Figure 4:
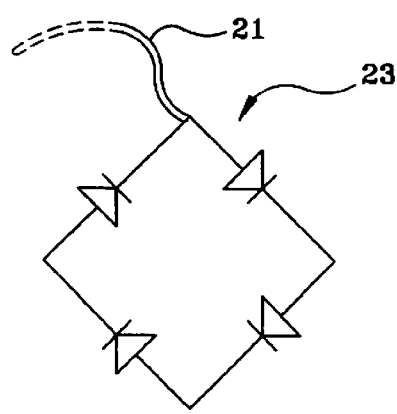
FIG. 4 is a top perspective view of the diode bridge in an embodiment of the present invention.

FIG. 4 illustrates a diode bridge 23 that may transport the flow of electrons from the lead wire 21 to a storage means 12. The diode bridge 23 may transform the flow of electrons to a constant polarity which may make the storage of electric energy more efficient. The constant polarity energy flow may then be converted by a converter (not shown) into either direct current (DC) power and/or alternating current (AC) power. A storage means (not shown) may be used to store the generated and transformed energy for distribution of electrical power.

Figure 5:
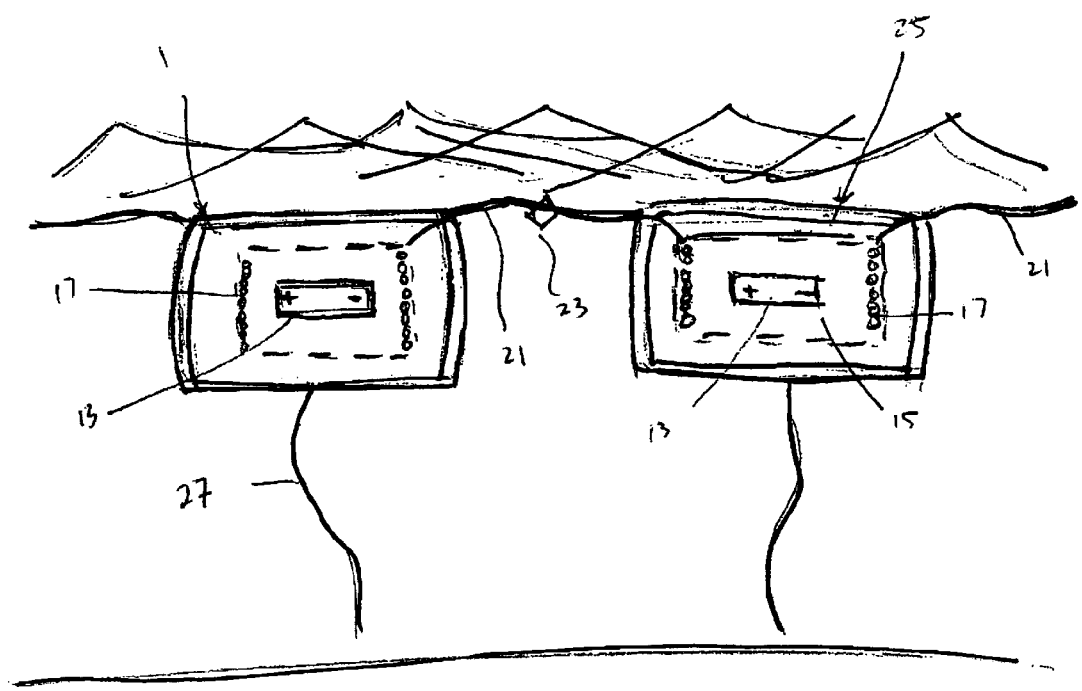
FIG. 5 is another side perspective view of the electric generation device illustrating the device in combination with another electric generation device in an embodiment of the present invention.
Figure 5:
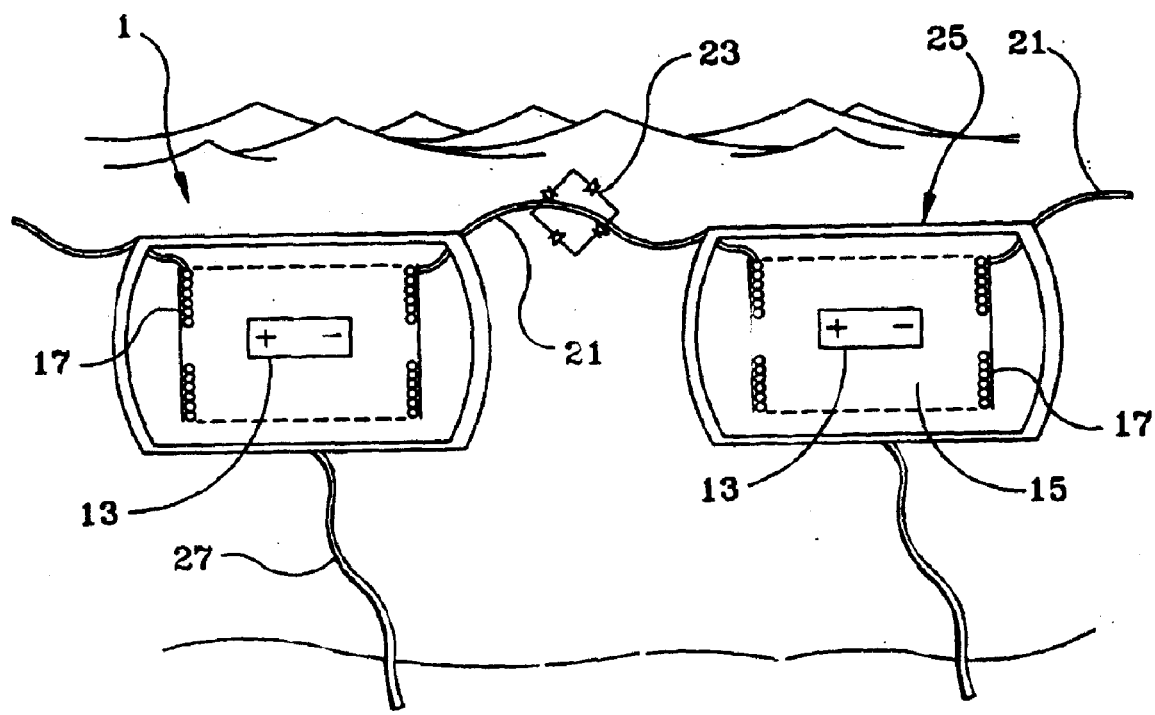

FIG. 5 illustrates the electric generation device 1 in water. FIG. 5 also illustrates a second electric generation device 25 connected to a first electric generation device 1 by a lead wire 21. As discussed previously, the electron flow may be directed from a first electric generation device 1 to a second electric generation device 25 and any number of subsequent electric generation devices (not shown). Alternatively, the electric generation device 1 may have a lead wire 21 that transports electron flow to a diode bridge 23 and/or a storage means 12. The electric generation device 1 may be anchored to the bottom of a free body of water by a tethering device 27 as illustrated by FIGS. 1 and 5.

It should be understood that various changes and modifications to the presently preferred embodiments described herein will be apparent to those skilled in the art. Such changes and modifications may be made without departing from the spirit and scope of the present invention and without diminishing its attendant advantages.

What is claimed is:

1. An electric generation device comprising:

a body having a top side and a bottom side;

said body being generally cylindrical in shape and further wherein said body has a opening therein;

a magnet contained within the body of the device wherein the magnet is placed in the opening of the body and further wherein said opening is larger than the size of the magnet allowing for free, random movement of the magnet within the opening in the electric generation device when the device is subjected to turbulence;

a plurality of wire coil enclosed within the body of the electric generation device wherein said magnet is enclosed in the opening of the body between the plurality of wire coil to collect electron flow wherein said plurality of wire coil forms the outside wall of the spool opening in the body of the device;

a diode bridge connected to the wire coil wherein the wire coil leads to the diode bridge.

2. The electric generation device of claim 1, wherein the opening is contained between the top side and the bottom side of the body.

3. The electric generation device of claim 1 wherein a plurality of diode bridges are attached to each other to transport electric power.

4. The electric generation device of claim 1 wherein the diode bridge transforms the flow of energy to a constant polarity for facilitation of storage of electrical power.

5. The electric generation device of claim 1 further comprising:

a spool flange wherein the plurality of wire core are attached thereto.

6. The electric generation device of claim 1 further comprising:

a spool coil cover attached to the spool flange wherein the spool cover covers the spool flange to protect the wire core and the magnet from contaminants and destruction.

7. The electric generation device of claim 1 further comprising:

a diode bridge to convert the electron flow to constant polarity wherein a power converter may transport electron flow in direct current power or alternating current power.

8. The electric generation device of claim 1 further comprising:

attaching a plurality of devices together to form a power station.

9. The electric generation device of claim 1 further comprising:

a storage means for storing the power collected by the electric generation device.

10. A method of using an electric generation device, the method comprising the steps of:

providing a body having an inside and an outside wherein said body is cylindrical in shape;

providing a wire coil in association with the inside of the body;

providing a magnet within the body of the device wherein random movement of the magnet in association with said wire coil produces a flow of electrons;

enclosing the magnet within the electric generation device, wherein a space exists between the magnet and the wire coil wherein the wire coil surrounds and encloses the body of the electric generation device and further wherein said space is defined by the outside wall of the wire coil spool in association with the inside of the body of the device; and inserting said electric generation device into a body of water.

11. The method as described in claim 10 further comprising:

providing a wire connected to a diode bridge wherein said diode bridge transforms the flow of electric current to a constant polarity.

12. The method as described in claim 10 further comprising:

attaching a plurality of the devices together to create a network of electric generation devices.

13. The method as described in claim 10 wherein said device is inserted into said body of water wherein said body of water includes lakes, rivers, oceans and streams.

14. The method as described in claim 10 wherein said magnet is moved in response to natural turbulence in the water.

15. The method as described in claim 10 wherein said magnet generates a flow of electrons that moves into the wire coil and further wherein the wire coil conducts the flow of electrons to a subsequent electric generation device.

16. The method as described in claim 10 wherein said magnet generates a flow of electrons that moves into the wire coil and further wherein the wire coil conducts the flow of electrons to the diode bridge.

17. The method as described in claim 10 wherein a power converter converts the electron flow into direct current power.

18. The method as described in claim 10 wherein a power converter converts the electron flow into alternating current power.

19. The method as described in claim 10 further comprising:

providing a storage means for collecting and storing the generated electric power.

20. The method as described in claim 10 further comprising:

providing a transportation means between the electric generation device and the storage means.

* * * * *

UNITED STATES PATENT AND TRADEMARK OFFICE
CERTIFICATE OF CORRECTION

PATENT NO. : 6,921,983 B2
DATED : July 26, 2005
INVENTOR(S) : Diamontopoulos, Aaron J.

It is certified that error appears in the above-identified patent and that said Letters Patent is hereby corrected as shown below:

Drawings,
Delete drawing sheet 3 of 3, and substitute therefore the drawing sheet, consisting of FIG. 5 as shown on the attached page.

Signed and Sealed this

Eleventh Day of October, 2005

JON W. DUDAS
*Director of the United States Patent and Trademark Office*